(12) United States Patent
Yoder et al.

(10) Patent No.: US 6,546,244 B1
(45) Date of Patent: Apr. 8, 2003

(54) SYSTEM AND METHOD FOR TESTING AN ASSEMBLED TELEPHONE

(75) Inventors: Stuart Yoder, Austin, TX (US); James Charles Baros, Round Rock, TX (US); Daniel Bryan Kelly, Round Rock, TX (US)

(73) Assignee: Siemens Information & Communication Mobile, LLC, San Diego, CA (US)

( * ) Notice: Subject to any disclaimer, the term of this patent is extended or adjusted under 35 U.S.C. 154(b) by 0 days.

(21) Appl. No.: 09/444,033

(22) Filed: Nov. 19, 1999

(51) Int. Cl.[7] .................................................. H04Q 7/20
(52) U.S. Cl. ...................... 455/425; 455/423; 455/67.4; 379/27.01; 379/27.04
(58) Field of Search ................................ 455/425, 67.1, 455/115, 423, 67.4; 379/27.01–27.04, 26.02

(56) References Cited

U.S. PATENT DOCUMENTS

| | | | | |
|---|---|---|---|---|
| 4,415,778 A | * | 11/1983 | Turner | 379/8 |
| 4,554,410 A | * | 11/1985 | Furumota | 379/27.08 |
| 4,602,134 A | * | 7/1986 | Atkinson et al. | 379/27.01 |
| 5,504,800 A | * | 4/1996 | Yehushua et al. | 379/27.01 |
| 5,539,803 A | * | 7/1996 | Bhat et al. | 379/21 |
| 5,644,618 A | * | 7/1997 | Komoda | 379/27.01 |
| 5,903,626 A | * | 5/1999 | Iglehart et al. | 379/28 |
| 5,910,977 A | * | 6/1999 | Torregrossa | 379/27.01 |

* cited by examiner

Primary Examiner—Edward F. Urban
Assistant Examiner—Temica M. Davis

(57) ABSTRACT

A method for testing an assembled telephone (10) includes activating the telephone (10) and automatically transmitting a poll command from a processor (60) of the telephone on a bus (66) of the telephone (10). The method also includes receiving a test command from a testing device connected to the bus (66) in response to the poll command. The test command is operable to automatically initiate a test of the telephone (10). The method further includes automatically initiating a standard operational mode of the telephone (10) if the test command is not received by the processor (60) in response to the poll command.

20 Claims, 3 Drawing Sheets

SYSTEM AND METHOD FOR TESTING AN ASSEMBLED TELEPHONE

RELATED APPLICATIONS

This application is related to the following co-pending Applications all filed on Nov. 19, 1999:

Ser. No. 09/443,939, entitled System and Method for Wireless Communication Incorporating Error Concealment;

Ser. No. 09/443,999, entitled System and Method for Simultaneously Testing Multiple Cordless Telephones;

Ser. No. 09/444,058, entitled System and Method for Wireless Communication Incorporating Range Warning;

Ser. No. 09/443,968, entitled Method and System for Wireless Telecommunication Between A Mobile Unit and A Base Unit;

Ser. No. 09/443,931, entitled Method and System for Avoiding Periodic Bursts of Interference In Wireless Communication Between A Mobile Unit and A Base Unit;

Ser. No. 09/444,028, entitled Method and System for Power-Conserving Interference Avoidance in Communication Between A Mobile Unit and A Base Unit In A Wireless Telecommunication System;

Ser. No. 09/444,008, entitled Method and System for Changing States In A Wireless Telecommunication System;

Ser. No. 09/443,933, entitled Method and System for Wireless Communication Incorporating Distinct System Identifier Bytes to Preserve Multi-frame Synchronization for Systems with Limited Control Channel Bandwidth;

Ser. No. 09/443,972, entitled System and Method for Wireless Communication Incorporating Synchronization Concept for 2.4 Ghz Direct Sequence Spread Spectrum Cordless Telephone System;

Ser. No. 09/443,166, entitled System And Method For Wireless Communication Incorporating Overloading Prevention Techniques for Multi-frame-synchronized Systems;

Ser. No. 09/443,998, entitled System and Method for Wireless Communication Incorporating Preloaded Response Message;

Ser. No. 09/444,057, entitled Method and System for a Wireless Communication System Incorporating Channel Selection Algorithm for 2.4 Ghz Direct Sequence Spread Spectrum Cordless Telephone System;

Ser. No. 09/443,997, entitled Method and System for Transmitting and Receiving Caller Id Data in a Wireless Telephone System;

Ser. No. 09/443,937, entitled Method and System for Prioritization of Control Messages In A Wireless Telephone System;

Ser. No. 09/443,996, entitled Method and System for Wireless Telecommunications Using a Multiframe Control Message;

Ser. No. 09/443,936, entitled Method and System for Transmitting Caller Id Information from a Base Station to a Mobile Unit Outside the Context of an Incoming Call; and Ser. No. 09/443,942, entitled Method and System for Data Compression.

TECHNICAL FIELD OF THE INVENTION

This invention relates generally to the field of telephone systems and, more particularly, to a system and method for testing an assembled telephone.

BACKGROUND OF THE INVENTION

Telephone systems and other electronic devices generally include electronic circuitry for controlling various operational functions of the device. For example, a telephone system may include a cordless telephone system having electronic circuitry contained within a base unit of the system and electronic circuitry contained within a mobile unit of the system. The electronic circuitry may control data communication between the base unit and the mobile unit and may control various other operational functions of the cordless telephone system.

Telephones and other electronic devices are generally constructed by disposing the electronic circuitry within a housing to protect the electronic circuitry from damage caused by moisture, impact, or other types of damage that may result from having exposed electronic circuitry. For example, the housing may generally include a base portion and a cover portion. The electronic circuitry is generally contained on a printed circuit board that is attached to either the base portion or the cover portion of the housing. Additionally, various electrical connections may be made between the electronic circuitry contained on the printed circuit board and external connections of the housing to support electronic communication between the printed circuit board and external devices. The base portion and cover portion of the housing are then secured to each other to enclose the electronic circuitry within the housing.

Once the housing is assembled, access to the electronic circuitry is generally limited. For example, the mobile unit of the cordless telephone system may include an electrical connection for a battery to supply power to the electronic circuitry contained within the mobile unit. However, the housing of the mobile unit generally prevents access to the electronic circuitry contained within the mobile unit housing. Therefore, testing the electronic circuitry after assembly and prior to delivery of the device generally requires manual operation of the device to ensure compliance with various operational specifications and requirements. However, manually testing the device is generally time consuming and cost prohibitive.

SUMMARY OF THE INVENTION

Accordingly, a need has arisen for a system and method for testing an assembled telephone that provides greater flexibility and reliability. The present invention provides a system and method for testing an assembled telephone that addresses shortcomings of prior systems and methods.

According to one embodiment of the present invention, a method for testing an assembled telephone includes activating the telephone and automatically transmitting a poll command from a processor of the telephone on a bus of the telephone. The method also includes receiving a test command from a testing device connected to the bus in response to the poll command. The test command is operable to automatically initiate a test of the telephone. If the test command is not received by the processor in response to the poll command, the method includes automatically initiating a standard operational mode of the telephone.

According to another embodiment of the present invention, a system for automatically testing an assembled telephone includes a testing device operable to transmit a test command to automatically test a feature of the telephone. The system also includes a housing of the telephone having an opening operable to receive the testing device. The system also includes a bus coupling a processor of the telephone to one or more peripheral devices of the telephone. The processor is operable to automatically transmit a poll command on the bus after activation of the telephone. The processor is further operable to receive the test command from the testing device in response to the poll command. The testing device is connected to the bus and the processor is further operable to automatically initiate a standard operational mode of the telephone if the test command is not perceived from the testing device.

The present invention provides several technical advantages. For example, in one embodiment of the invention, a mobile unit of a cordless telephone system includes a plurality of openings for receiving pins of a testing device. The pins of the testing device may be inserted through the openings to contact a bus of the mobile unit. After the telephone is activated, a processor of the mobile unit automatically transmits a poll command on the bus to detect the presence of the testing device. If the processor receives a test command from the testing device in response to the poll command, the processor performs various testing operations as directed by the testing device. If the processor does not receive a test command from the testing device, the processor automatically initiates a normal operational mode of the telephone. Thus, the present invention provides a convenient and reliable system and method for testing an assembled telephone system. Additionally, the present invention may be used to diagnostically test the assembled telephone prior to or after delivery of the telephone to a consumer.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

Embodiments of the present invention and the advantages thereof are best understood by referring to the following description and drawings, wherein like numerals are used for like and corresponding parts of the various drawings.

Figure 1:
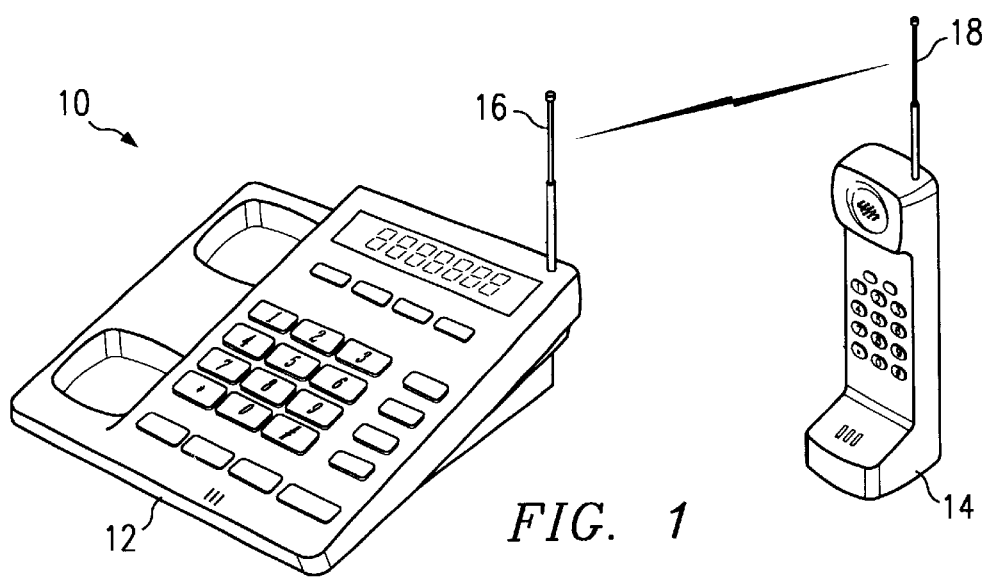
FIG. 1 is a diagram illustrating a cordless telephone system in accordance with an embodiment of the present invention.

FIG. 1 is a diagram illustrating a cordless telephone system 10 in accordance with an embodiment of the present invention. Cordless telephone system 10 generally comprises a base unit 12 and a mobile unit 14. Base unit 12 and mobile unit 14 may each include an antenna 16 and 18, respectively, for providing data communication between base unit 12 and mobile unit 14.

Figure 2:
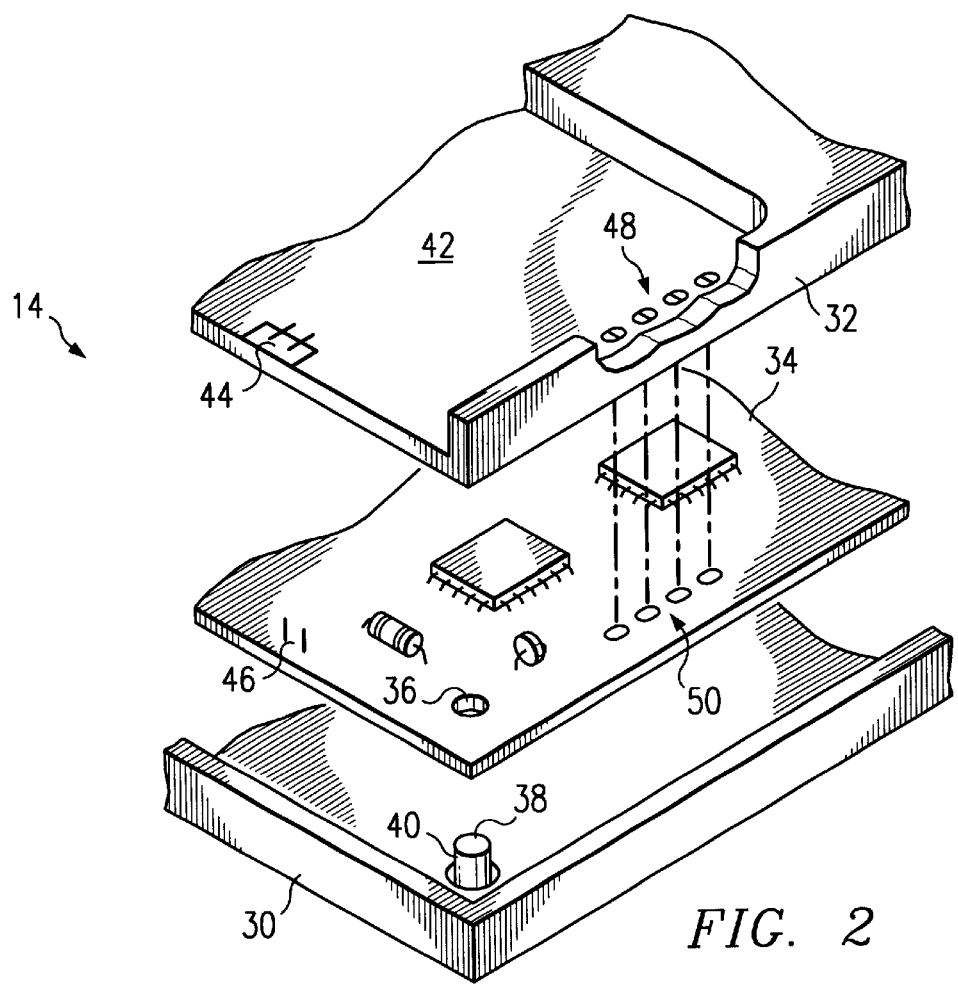
FIG. 2 is a diagram illustrating a portion of a mobile unit of the cordless telephone system in accordance with an embodiment of the present invention.

FIG. 2 is a diagram illustrating mobile unit 14 in accordance with an embodiment of the present invention. Mobile unit 14 comprises a housing base 30 and a housing cover 32. Mobile unit 14 also comprises a printed circuit board 34 containing electronic circuitry for controlling various operational functions of telephone system 10. In operation, printed circuit board 34 is positioned and secured between housing base 30 and housing cover 32 such that the electronic circuitry contained on printed circuit board 34 is protected within housing base 30 and housing cover 32. For example, fasteners (not explicitly shown) may be inserted through openings 36 in printed circuit board 34 to engage an internally threaded opening 38 disposed on a pedestal 40 of housing base 30. However, other suitable methods or devices may be used to secure printed circuit board 34 within housing base 30 and housing cover 32.

As illustrated in FIG. 2, housing cover 32 also comprises a battery compartment 42 for receiving a battery or power supply (not explicitly shown) for supplying operational power to printed circuit board 34. For example, battery compartment 42 may comprise contacts 44 extending through housing cover 32 to leads 46 of printed circuit board 34 to provide an electrical conduit for power supplied by the battery to printed circuit board 34.

Housing cover 32 also comprises one or more openings 48 extending through housing cover 32 and in alignment with one or more corresponding electrical pads 50 disposed on printed circuit board 34. Pads 50 are connected to electronic circuitry contained on printed circuit board 34, thereby providing an interface to the electronic circuitry contained on printed circuit board 34. In this embodiment, openings 48 are disposed within battery compartment 42 such that subsequent installation of the battery and a battery compartment cover (not explicitly shown) provide a protective barrier to printed circuit board 34 contained within mobile unit 14. However, other suitable locations on mobile unit 14 may be used to provide access to electronic circuitry contained on printed circuit board 34.

In operation, a testing system connection or testing device (not explicitly shown) may include one or more pins to extend through openings 48 to contact pads 50 such that the testing device may electronically communicate with the electronic circuitry contained on printed circuit board 34. In the embodiment illustrated in FIG. 2, pads 50 are used in association with pins of the testing device to provide a connection to the electronic circuitry contained on printed circuit board 34. However, other suitable methods or devices may be used to provide a connection between the electronic circuitry contained on printed circuit board 34 and the testing device.

Figure 3:
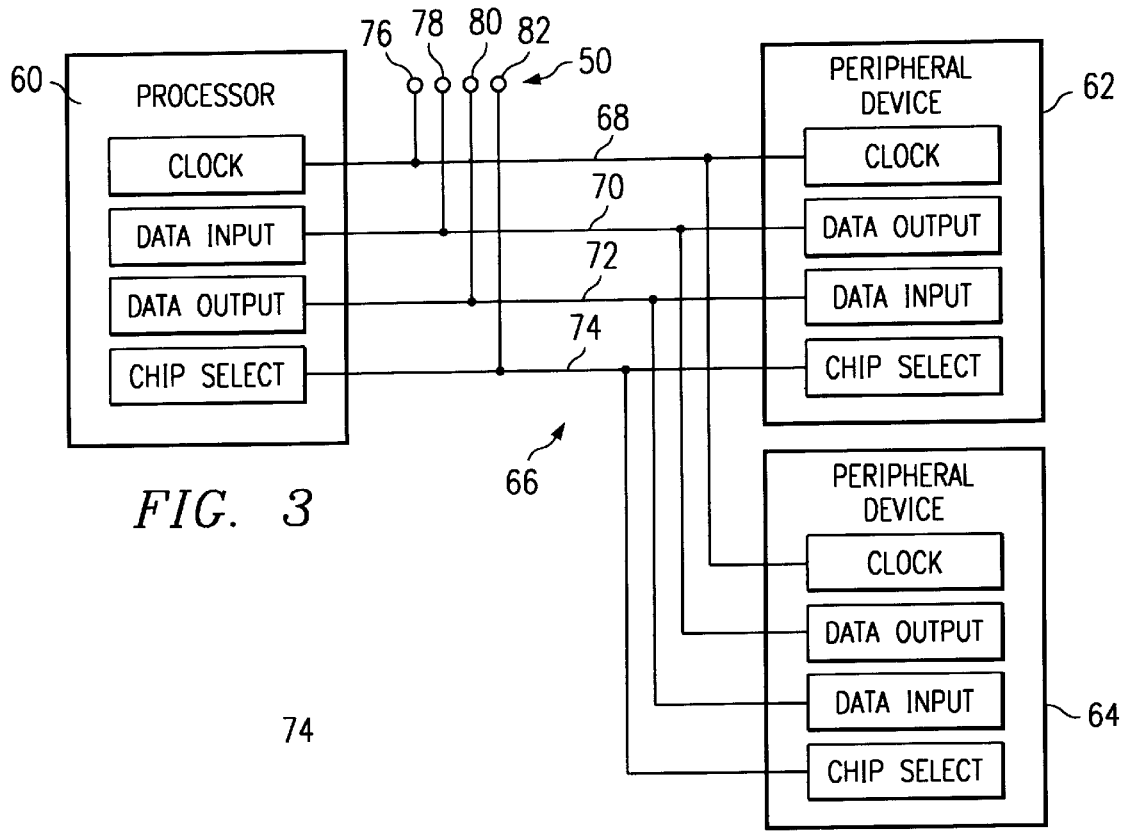
FIG. 3 is a block diagram illustrating an electronic interface system of the cordless telephone system in accordance with an embodiment of the present invention.

FIG. 3 is a block diagram illustrating pads 50 and an interface of the electronic circuitry contained on printed circuit board 34 in accordance with an embodiment of the present invention. For example, the electronic circuitry may comprise a processor 60 and peripheral devices 62 and 64 electronically coupled together through a serial peripheral interface (SPI) bus 66. Peripheral devices 62 and 64 may comprise integrated circuits or other electronic circuitry devices contained on printed circuit board 34. Additionally, processor 60 may be contained within an integrated circuit contained on printed circuit board 34.

In this embodiment, SPI bus 66 generally comprises a clock line 68, a data input line 70, a data output line 72, and a chip select line 74. Generally, processor 60 communicates with peripheral devices 62 and 64 and other electronic circuitry devices contained on printed circuit board 34 on SPI bus 66. For example, clock line 68 may be used to regulate the flow of data between processor 60 and peripheral devices 62 and 64, such as using time division multiplexing of data communicated between processor 60 and peripheral devices 62 and 64. Processor 60 generally receives data from peripheral devices 62 and 64 on data input line 70 of SPI bus 66 and transmits data to peripheral devices 62 and 64 on data output line 72 of SPI bus 66. Additionally, processor 60 may use chip select line 74 to identify a particular peripheral device 62 or 64 to perform a particular function corresponding to the data communicated to the particular peripheral device 62 or 64.

As illustrated in FIG. 3, electronic pads 50 comprise electronic pads 76, 78, 80, and 82. Electronic pad 76 is coupled to clock line 68, electronic pad 78 is coupled to data input line 70, electronic pad 80 is coupled to data output line 72, and electronic pad 82 is coupled to chip select line 74. As described above, a testing device may include four pins, each pin contacting an electronic pad 76, 78, 80, or 82. Thus, electronic pads 76, 78, 80, and 82 are used to provide an electrical connection between the testing device and SPI bus 66.

In operation, telephone system 10 may be activated by a user of telephone system 10 by providing a power source to telephone system 10 or otherwise initiating activation of telephone system 10. Once activated, processor 60 automatically transmits a poll command on SPI bus 66 to detect the presence of the testing device. For example, processor 60 may select an address corresponding to the testing device and transmit the poll command on SPI bus 66. Accordingly, the address corresponding to the testing device is different than the addresses corresponding to peripheral devices 62 and 64 such that peripheral devices 62 and 64 receive but do not perform any operations in response to receiving the poll command.

If the testing device is coupled to SPI bus 66 through pads 76, 78, 80, and 82, the testing device may transmit a test command on SPI bus 66 to processor 60. In response to receiving the test command from the testing device, processor 60 may transmit signals to peripheral devices 62 and 64 or other electronic circuitry devices of telephone system 10 to perform the test operation directed by the test command. Once the testing operation directed by the test command is complete, the test results may be transmitted from processor 60 to the testing device on SPI bus 66. Alternatively, the user may verify or other wise determine the results of the testing operation. Additionally, once the test operation is complete, the testing device may be used to transmit another test command to perform additional testing operations.

If processor 60 does not receive a test command in response to transmitting the poll command, processor 60 may be configured to automatically initiate a standard operational mode of telephone system 10. For example, processor 60 may be configured such that after expiration of a predetermined period of time after transmitting the poll command, processor 60 automatically initiates a standard operational mode of telephone system 10 if processor 60 does not receive a test command. Thus, if the testing device is not connected to pads 76, 78, 80, or 82, or the testing device does not transmit a test command on SPI bus 66, processor 60 automatically initiates a standard operational mode of telephone system 10.

Figure 4:
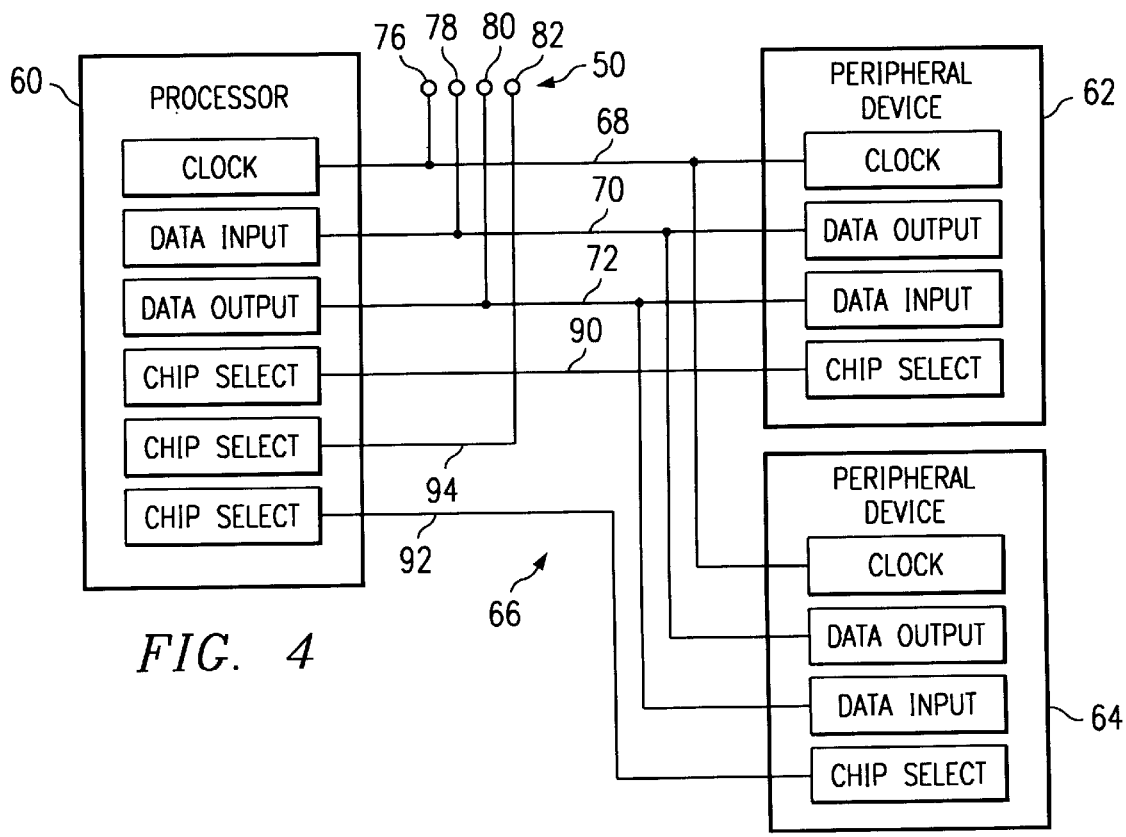
FIG. 4 is a block diagram illustrating another electronic interface system of the cordless telephone system in accordance with an embodiment of the present invention.

FIG. 4 is a block diagram illustrating another embodiment of the electronic circuitry interface contained on printed circuit board 34 in accordance with the present invention. In this embodiment, SPI bus 66 comprises a chip select line 90, a chip select line 92, and a chip select line 94. Chip select line 90 is coupled between processor 60 and peripheral device 62, chip select line 92 is coupled between processor 60 and peripheral device 64, and chip select line 94 is coupled between processor 60 and pad 82.

As described above, once telephone system 10 is activated, processor 60 transmits a poll command to detect the presence of the testing device. For example, once telephone system 10 is activated, processor 60 may be configured to automatically transmit a poll command on SPI bus 66 to determine whether a testing operation is required or whether processor 60 may initiate the standard operational mode of the telephone system 10. Processor 60 may transmit the poll command on SPI bus 66 and use chip select line 94 corresponding to pad 82 to select the testing device to respond to the poll command. Thus, because chip select line 94 is selected in connection with the poll command, peripheral devices 62 and 64 are not selected to perform any functions in response to the poll command or respond to the poll command.

In response to receiving the poll command from processor 60, the testing device may transmit a test command on SPI bus 66 to direct a testing operation of telephone system 10. For example, the test command may require activation of a liquid crystal display (not explicitly shown) of telephone system 10, activation of a display backlight (not explicitly shown), or other testing operations generally performed in accordance with the operational requirements of telephone system 10.

After completion of the testing operation directed by the test command, processor 60 may transmit the results of the testing operation to the testing device on SPI bus 66. Alternatively, the user of telephone system 10 may verify or otherwise determine the results of the testing operation. The user may also direct the testing device to transmit another test command to repeat the testing operation or to perform another testing operation.

If processor 60 does not receive a test command in response to the poll command, processor 60 may be configured to automatically initiate a standard operational mode of telephone system 10. For example, processor 60 may be configured such that after expiration of a predetermined period of time, if a test command is not received after transmitting the poll command, processor 60 automatically initiates the standard operational mode of the telephone system 10. Thus, if the testing device is not coupled to pads 76, 78, 80, or 82, or the testing device does not transmit a test command, processor 60 automatically initiates a standard operational mode of telephone system 10.

Figure 5:
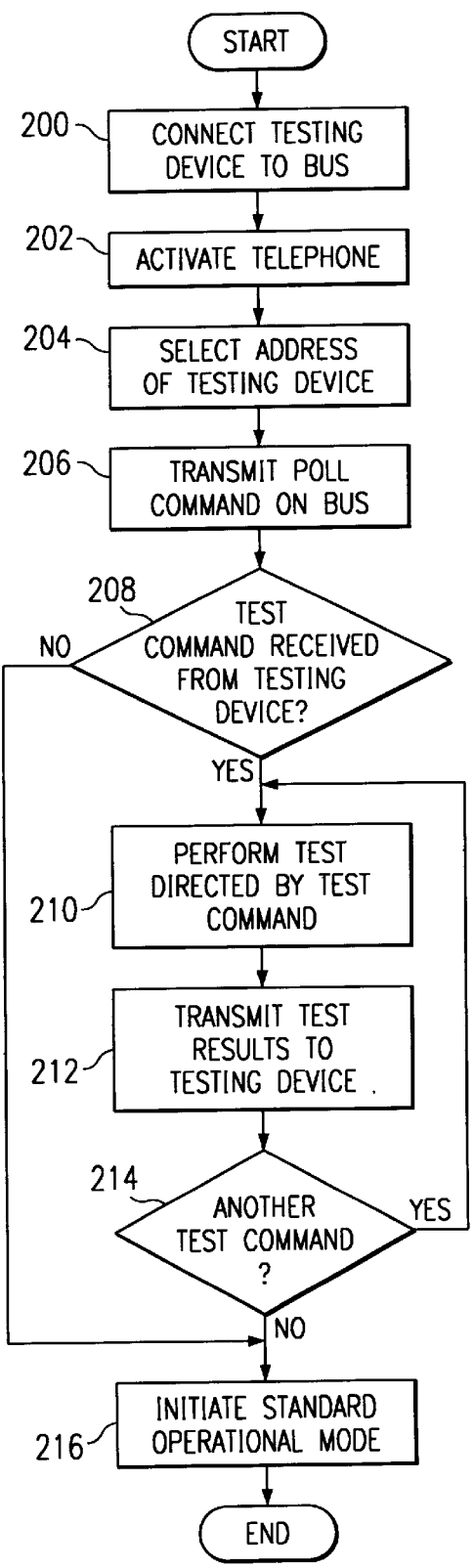
FIG. 5 is a flow diagram illustrating a method of testing an assembled telephone system in accordance with an embodiment of the present invention.

FIG. 5 is a flow diagram illustrating a method for testing an assembled telephone system in accordance with an embodiment of the present invention. The method begins at step 200 where a testing system connection or testing device may be connected to pads 76, 78, 80, and 82 of SPI bus 66. At step 202, telephone system 10 may be activated. For example, a power source may be connected or otherwise supplied to telephone system 10 to initiate activation of telephone system 10. Once activated, processor 60 selects an address corresponding to the testing device at step 204. At step 206, processor 60 transmits a poll command on SPI bus 66 to determine whether the testing device is connected to SPI bus 66. In response to receiving the poll command, the testing device may transmit a test command directing various testing operations of telephone system 10.

At decisional step 208, processor 60 determines whether a test command is received from the testing device. If a test command is not received by processor 60 from the testing device, the method proceeds directly to step 216. If a test command is received by processor 60 from the testing device, the method proceeds to step 210 where processor 60 performs the testing operation directed by the test command. After performing the testing operation directed by the test command, processor 60 may transmit the results of the testing operation to the testing device at step 212. However, as described above, the results of the testing operation may be otherwise verified or determined.

At decisional step 214 processor 60 determines whether an additional testing operation is required. For example, the testing device may transmit another test command on SPI bus 66 to processor 60 directing another testing operation be performed. If another test command is received by processor 60, the method returns to step 210 where processor 60 performs the testing operations directed by the new test command. If another test command is not received by processor 60, the method proceeds to step 216 where processor 60 initiates a standard operational mode of telephone system 10. Thus, if the testing device is not connected to SPI bus 66 or a test command is not received by processor 60 within a predetermined period of time after transmitting the poll command, processor 60 may be configured to automatically initiate a standard operational mode of telephone system 10.

Figure 6:
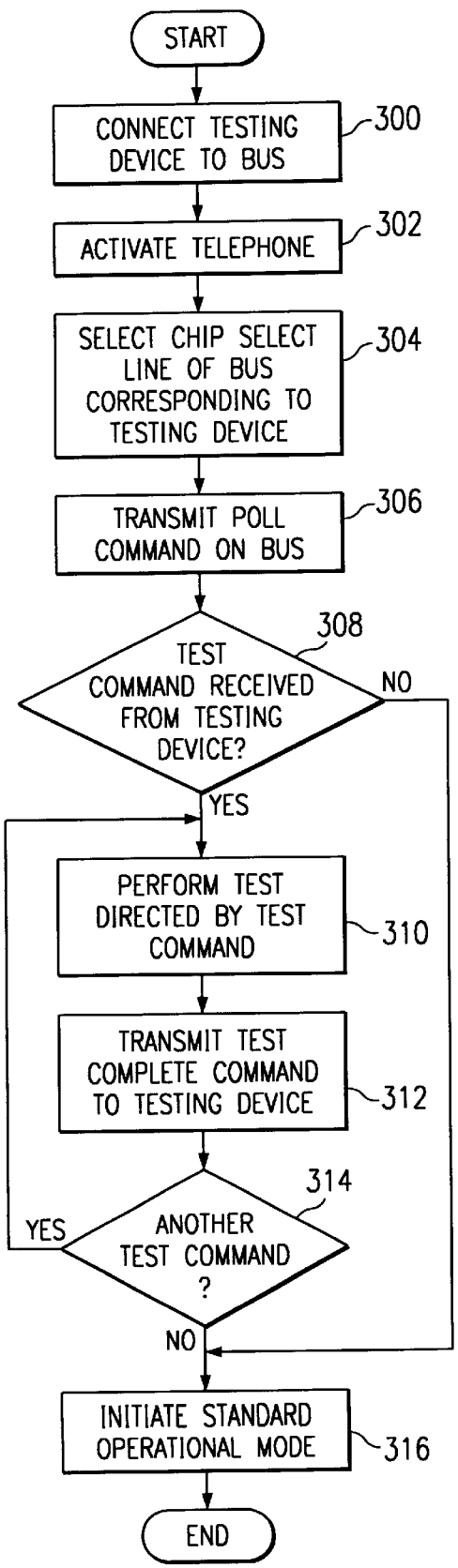
FIG. 6 is another flow diagram illustrating a method for testing an assembled telephone system in accordance with an embodiment of the present invention.

FIG. 6 is a flow diagram illustrating another method for testing an assembled telephone in accordance with an embodiment of the present invention. The method begins at step 300 where the testing system connection or testing device is connected to SPI bus 66 using pads 76, 78, 80, and 82. At step 302, telephone system 10 is activated by providing a power source to telephone system 10 or otherwise activating telephone system 10. At step 304, processor 60 selects chip select line 94 corresponding to the testing device. At step 306, processor 60 transmit a poll command on SPI bus 66 to determine whether the testing device is connected to SPI bus 66.

Once processor 60 transmits the poll command on SPI bus 66, the testing device may transmit a test command on SPI bus 66 in response to receiving the poll command. At decisional step 308, processor 60 determines whether a test command is received from the testing device. If a test command is not received from the testing device within a predetermined period of time, the method proceeds directly to step 316. If a test command is received by processor 60 in response to the poll command, the method proceeds to step 310.

At step 310, processor 60 performs the testing operation as directed by the test command. At step 312, processor 60 may transmit the results of the testing operation directed by the test command to the testing device. However, as described above, verification of the test results may be otherwise determined. At decisional step 314, processor 60 determines whether another testing operation is required. For example, after completion of the prior testing operation, the testing device may transmit another test command to processor 60 directing another testing operation.

If processor 60 receives another test command, the method returns to step 310 where the testing operation directed by the new test command is performed. If another test command is not received by processor 60, the method proceeds to step 316. For example, processor 60 may be configured such that if a test command is not received within a predetermined period of time following the completion of a testing operation, the method automatically proceeds to step 316 where processor 60 automatically initiates a standard operational mode of telephone system 10.

Therefore, the present invention provides greater flexibility and efficiency than prior testing systems and methods. For example, as illustrated in FIG. 3, a testing system connection or testing device may be connected to SPI bus 66 without requiring an independent chip select line dedicated solely for the testing device. Thus, an additional port pin is generally not required on processor 60 to support the testing device connection.

Additionally, the present invention provides greater efficiency than prior systems and methods by substantially alleviating the requirement of an additional bus supporting a testing device interface. Thus, design and manufacturing time and costs are generally reduced and existing electronic circuitry may be used with little or no modification. Additionally, testing may generally be performed automatically without the need for manual intervention. In addition, although FIG. 2 illustrates providing access to the electronic circuitry contained within mobile unit 14, the present invention also contemplates using the above described system and method to provide access to electronic circuitry contained within base unit 12.

Although the present invention and its advantages have been described in detail, it should be understood that various changes, substitutions, and alterations can be made therein without departing from the spirit and scope of the present invention as defined by the appended claims.

What is claimed is:

1. A method for testing an assembled telephone, comprising:
    activating the telephone;
    automatically transmitting a poll command from a processor of the telephone on a bus of the telephone;
    receiving a test command from a testing device connected to the bus in response to the poll command, the test command operable to automatically initiate a test of the telephone; and
    automatically initiating a standard operational mode of the telephone if the test command is not received by the processor in response to the poll command.

2. The method of claim 1, wherein automatically transmitting the poll command comprises:
    selecting an address of the testing device on the bus; and
    transmitting the poll command to the selected address.

3. The method of claim 1, wherein automatically transmitting the poll command further comprises selecting a chip select line of the bus corresponding to the testing device.

4. The method of claim 1, further comprising:
    connecting the testing device to the bus, the bus coupling the processor to one or more peripheral devices of the telephone; and
    wherein automatically transmitting the poll command comprises selecting an address of the testing device on the bus and transmitting the poll command to the selected address.

5. The method of claim 1, further comprising:
    disposing a pin of the testing device through an opening of the telephone to contact the bus, the bus coupling the processor to one or more peripheral devices of the telephone; and
    wherein automatically transmitting the poll command comprises selecting an address of the testing device on the bus and transmitting the poll command to the selected address.

6. The method of claim 1, further comprising:

disposing a pin of the testing device through an opening of the telephone to contact a pad of the bus, the bus coupling the processor to one or more peripheral devices of the telephone, the bus having a chip select line corresponding to the pad of the bus and one or more chip select lines corresponding to the peripheral devices; and wherein automatically transmitting the poll command comprises selecting the chip select line corresponding to the pad of the bus and transmitting the poll command on the bus.

7. The method of claim 1, further comprising automatically initiating the standard operational mode of the telephone in response to receiving a test complete command from the testing device.

8. A system for automatically testing an assembled telephone, comprising:

a testing device operable to transmit a test command, the test command operable to automatically test a feature of the telephone;

a housing of the telephone having an opening operable to receive the testing device; and a bus coupling a processor of the telephone to one or more peripheral devices of the telephone, the processor operable to automatically transmit a poll command on the bus after activation of the telephone, the processor further operable to receive the test command from the testing device in response to the poll command, the testing device connected to the bus, and wherein the processor is further operable to automatically initiate a standard operational mode of the telephone if the test command is not received from the testing device.

9. The system of claim 8, wherein the testing device comprises one or more pins operable to contact the bus.

10. The system of claim 8, wherein the processor is further operable to select an address corresponding to the testing device.

11. The system of claim 8, wherein the bus comprises one or more chip select lines coupled to the peripheral devices, and wherein the bus further comprises a pad operable to receive a pin of the testing device, and wherein the bus further comprises a chip select line corresponding to the pad, and wherein the processor is further operable to select the chip select line corresponding to the pad and transmit the poll command.

12. The system of claim 8, wherein the telephone comprises a cordless telephone having a base and a mobile unit, and wherein the housing of the mobile unit comprises the opening operable to receive the testing device.

13. The system of claim 8, wherein each of the peripheral devices is coupled to a chip select line of the bus, and wherein the testing device comprises a pin operable to contact the chip select line of the bus, and wherein the processor is further operable to select the testing device using the chip select line and transmit the poll command.

14. A method for automatically testing an assembled telephone, comprising:

connecting a testing device to a bus of the telephone, the bus connecting a processor to one or more peripheral devices of the telephone;

activating the telephone;

automatically transmitting a poll command from the processor on the bus;

receiving a test command from the testing device in response to the poll command, the test command operable to initiate a test of the telephone; and if the test command is not received in response to the poll command, automatically initiating a standard operational mode of the telephone.

15. The method of claim 14, wherein connecting comprises inserting a pin of the testing device through an opening of a housing of the telephone to contact the bus.

16. The method of claim 14, wherein automatically transmitting the poll command comprises:

selecting an address of the testing device on the bus; and transmitting the poll command to the selected address.

17. The method of claim 14, wherein automatically transmitting the poll command further comprises selecting a chip select line of the bus corresponding to the testing device.

18. The method of claim 14, further comprising automatically initiating the standard operational mode of the telephone in response to a test complete command received from the testing device.

19. The method of claim 14, wherein the bus comprises a chip select line coupled to each peripheral device, and wherein connecting the testing device comprises connecting a pin of the testing device to the chip select line, and wherein automatically transmitting the poll command comprises selecting an address of the testing device on the bus and transmitting the poll command.

20. The method of claim 14, wherein the bus comprises one or more chip select lines, each chip select line coupled to a peripheral device, and wherein the bus further comprises a chip select line corresponding to the testing device, and wherein automatically transmitting the poll command comprises selecting the testing device using the chip select line corresponding to the testing device and transmitting the poll command.

* * * * *